United States Patent [19]

Schwartz

[11] 4,280,861
[45] Jul. 28, 1981

[54] APPARATUS FOR REPAIRING LAMINATED SAFETY GLASS

[76] Inventor: Herbert S. Schwartz, 915 SW. 101st Ave., Miami, Fla. 33174

[21] Appl. No.: 180,691

[22] Filed: Aug. 25, 1980

[51] Int. Cl.³ .............................................. B32B 31/00
[52] U.S. Cl. ..................................... 156/382; 156/94; 156/578; 264/36; 264/102; 425/13
[58] Field of Search ................. 156/94, 286, 382, 578; 264/36, 23, 102; 425/12, 13; 65/28

[56] References Cited

U.S. PATENT DOCUMENTS

| | | | |
|---|---|---|---|
| 3,765,975 | 10/1973 | Hollingsworth | 156/94 |
| 3,993,520 | 11/1976 | Werner et al. | 156/94 |
| 4,047,863 | 9/1977 | McCluskey | 156/94 X |
| 4,132,516 | 1/1979 | Story | 156/94 X |
| 4,200,478 | 4/1980 | Jacino et al. | 156/382 X |
| 4,208,229 | 6/1980 | Giardini | 156/94 |

Primary Examiner—David A. Simmons

Attorney, Agent, or Firm—Ernest H. Schmidt

[57] ABSTRACT

In the repair of localized zones of damage to laminated safety glass with use of a polymerizable liquid, a T-fitting has one of the opposed legs threadingly received through an internally-threaded central opening in a transparent, hemispherical suction cup adapted to support the fitting in perpendicular alignment with the damaged zone for adjustable seating in sealing contact thereabout. A pierceable, resilient disk at the outer end of the opposite leg of the fitting provides for the insertion therethrough, to reach the damaged zone, of the hollow needle of a medical syringe for mechanically flexing the damaged zone and depositing the polymerizable repair fluid. The transverse leg of the T-fitting connects with a flexible hose for alternately imposing vacuum and applying air pressure to the interior of the fitting to facilitate the withdrawal of air from the damaged zone and substitution of the polymerizable fluid so as to achieve a practically invisible repair.

7 Claims, 5 Drawing Figures

U.S. Patent
Jul. 28, 1981
4,280,861
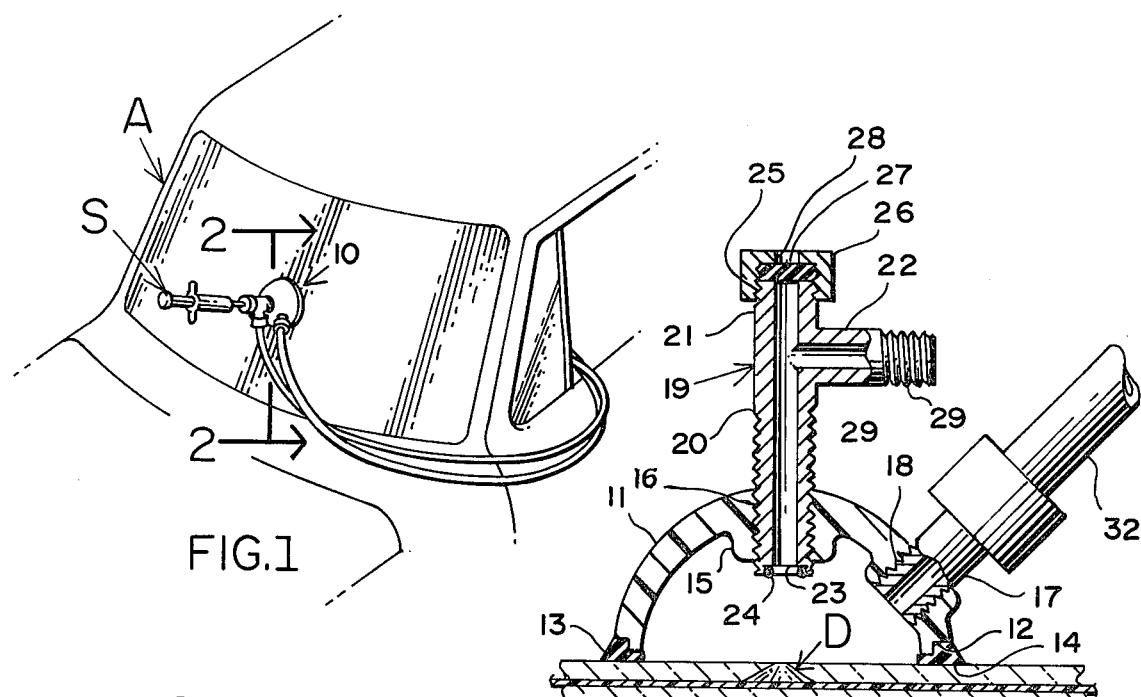
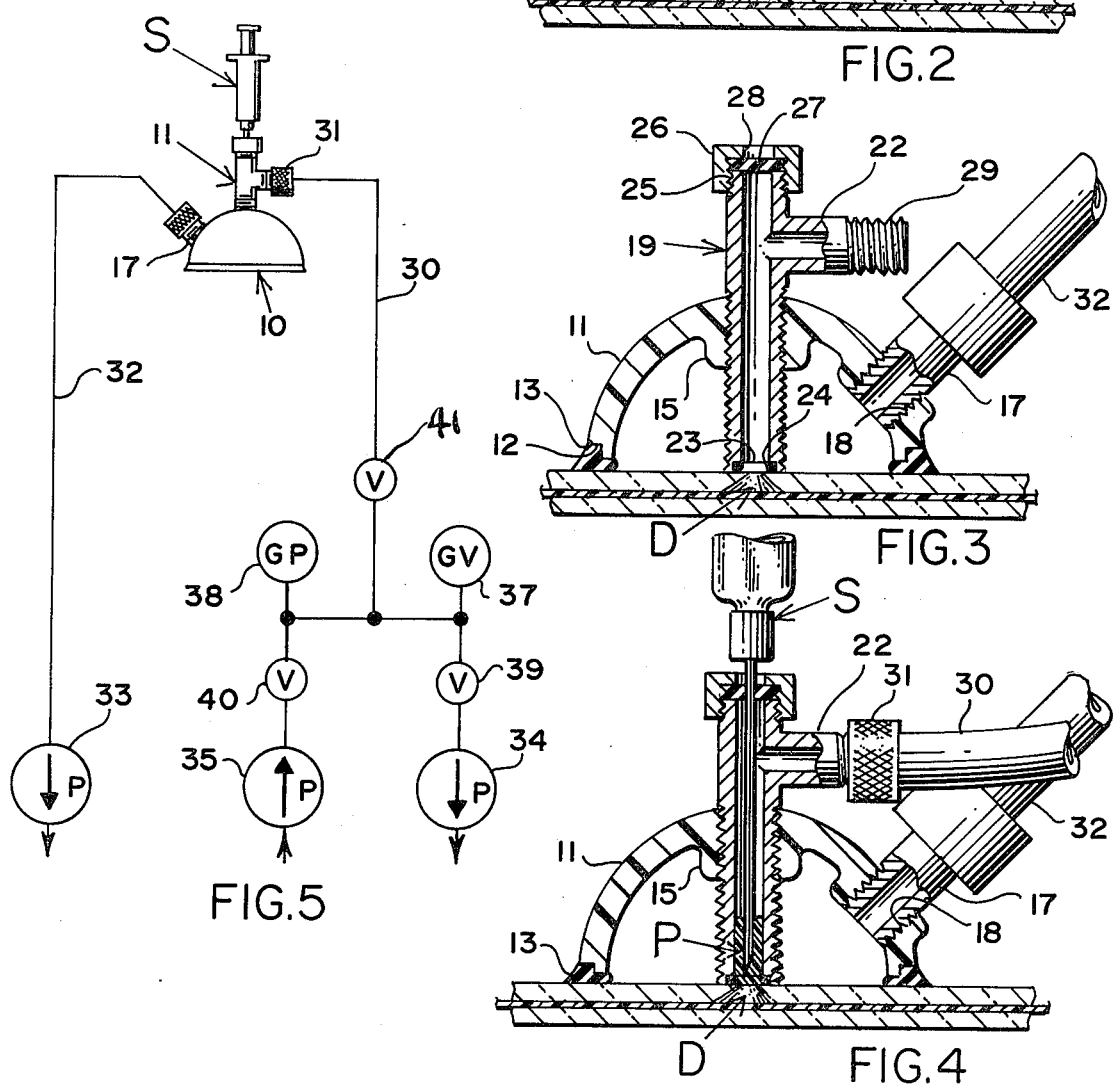

4,280,861

APPARATUS FOR REPAIRING LAMINATED SAFETY GLASS

BACKGROUND OF THE INVENTION

This invention relates to the repair of damaged laminated safety glass or shatter-proof glass commonly used in the manufacture of automobile windshields, for example. Because such safety glass comprises a lamination of two plates of glass sandwiching a transparent binder, localized impact damage resulting in so-called "bullseye", "half-moon", "daisy" and "star", cracks usually affects only the outer plate of the lamination. For this reason it has been found that such localized cracked zones can be filled with transparent resins while in the liquid state to restore substantially the original transparency, visibility and strength to the windshield. Various systems and apparatus have been devised for carrying out such repairs, all of which have in common a support structure securable in surrounding relation with respect to the damaged glass zone to be repaired, mechanism for applying the repair fluid against the damaged zone within such a supporting structure, and means for effecting a vacuum within the supporting structure to withdraw air from the damaged zone and, in some instances, subsequently applying pressure thereat so as to replace all of the voids created by the damage with a clear polymerizable fluid. U.S. Pat. No. 4,047,863 to McCluskey et. al., 4,165,397 to Ogden et. al. and 4,200,478 to Jacino et. al. describe such damaged shatter-proof or safety glass repair apparatus. In each instance of the prior art apparatus, the repair fluid is placed and contained against the outside of the damaged zone in such a way as to obstruct any possibility of mechanically stressing the damaged zone by manipulation of a tool from the outside of the vacuum containing apparatus and while the damaged zone is under air pressure. Such mechanical stressing at the damaged zone while under air pressure and flooded with the repair fluid has been found to greatly facilitate the rapidity and completeness with which the fluid replaces air in all multiple fissures and interstices of the damaged zone.

It is, accordingly, the principal object of this invention to provide a novel and improved apparatus for repairing laminated or safety glass that permits mechanically stressing the damaged glass zone while under either vacuum or pressure and while flooded with the repair fluid.

It is another object of the invention to provide a repair apparatus of the character described wherein the repair fluid is applied by injection through a resilient disk into the vacuum or pressurized area surrounding the damaged zone, the tip of the hollow needle or cannula of the medical syringe serving as a tool for applying mechanical pressure to the damaged zone by manipulation of the syringe from the outside.

It is yet another object to provide a repair apparatus of the above nature in which the amount of repair fluid deposited can be closely controlled during the repair process by use of the syringe.

Still another object is to provide a repair apparatus of the character described wherein the air pressure and vacuum supplied above the damaged glass area are supplied through flexible hoses leading to the vacuum and/or pressure pumps for remote control, whereby the operator can perform the repair procedure of the most part at a convenient location, such as within the vehicle rather than at the outside. This is especially important in inclement weather and instances where the damage to be repaired is inconveniently located, such as high on the windshield of a large bus or truck.

Yet another object of the invention is to provide a repair apparatus of the character described wherein contact of the repair fluid with the fluid retaining means surrounding the damaged zone is kept to a minimum to facilitate clean-up upon completion of the procedure, and wherein repair time and labor is kept to a minimum by use of inexpensive, disposable medical syringes.

Yet another object of the invention is to provide a laminated safety glass repair apparatus of the character described which will be inexpensive to manufacture, superior in performance, and simple and long-wearing operation.

Other objects, features and advantages of the invention will be apparent from the following description when read with reference to accompanying drawings.

BRIEF DESCRIPTION OF THE DRAWINGS

In the drawings, wherein like reference numerals denote corresponding parts throughout the several views:

FIG. 1 illustrates use of the apparatus in the repair of a damaged automobile windshield;

FIG. 2 is a vertical cross-sectional view of the apparatus taken along the line 2—2 of FIG. 1 in the direction of the arrows and on an enlarged scale to illustrate mechanical details;

FIG. 3 is a cross-sectional view similar to that of FIG. 2 but showing the T-fitting screwed down against the damaged zone to be repaired;

FIG. 4 illustrates how the hypodermic needle is inserted through the resilient sealing disk at the upper end of the T-fitting for imposing mechanical pressure on the damaged zone and supplying the repair fluid; and FIG. 5 is a schematic diagram illustrating the interconnection of the vacuum and air pressure supply hoses to the repair apparatus illustrated in FIGS. 1 through 4.

DESCRIPTION OF THE PREFERRED EMBODIMENT

Referring now in detail to the drawings, reference numeral 10 in FIG. 1 illustrates an apparatus embodying the invention applied against the outside of the windshield of an automotive vehicle A during the process of repairing localized damage such as is usually caused, for example, by road stones lifted and propelled by passing vehicles during expressway driving at high speeds. As illustrated in FIG. 2, the apparatus 10 comprises a hemispherical vacuum cup 11, which will preferably be fabricated of a tough, transparent, synthetic plastic material. The peripheral edge of vacuum cup 11 is formed with an outer, marginal, peripheral recess 12 for the interfitting reception of an annular, resilient gasket 13 having a flat outer surface 14 adapted to seal against the surface of the windshield or other laminated safety glass to be repaired, in concentric relation with respect to the damaged zone. The inside center of the vacuum cup 11 is integrally formed with a circular zone of increased thickness 15 which, together with the adjacent portion of the cup, is provided with an internally-threaded, radially-extending through opening 16. The vacuum cup 11 is also provided with a sidewardly-outwardly-extending hose connector fitting 17, which may, for example, be secured and cemented in place within an internally-threaded sidewall opening 18 in said vacuum cup.

The apparatus further comprises a T-fitting 19 having opposed, long and short leg portions 20, 21 respectively, and a laterally-outwardly-extending leg portion 22. The long leg portion 20 of T-fitting 19 is externally threaded and of such size and length as to be threadingly received within the internally-threaded opening 16 of vacuum cup 11 and permit screwing down so that its outer end can be extended at least to the plane defined by the outer end of the glass-abutting surface of gasket 13 (see FIG. 3). The outer end of long T-fitting leg portion 19, moreover, is formed with an increased-diameter, annular groove 23 within which is seated an outwardly-projecting, resilient O-ring 24 adapted to be seated in sealing engagement about the damaged zone of laminated glass to be repaired, as is hereinafter more particularly described.

The short leg portion 21 of T-fitting 19 is externally threaded at its outer end, as indicated at 25, to receive an internally-threaded, screw-on cap 26. Seated within the cap 26 is a resilient disk 27 of soft rubber, neoprene, or the like, which can be readily pierced by a cannula such as a hypodermic needle for the injection of the glass repair fluid in the manner hereinafter more particularly described. The screw cap 26 is provided with a central opening 28 for passage of the needle.

The laterally-outwardly-extending leg portion 22 of T-fitting 19 is externally threaded, as indicated at 29, for removable connection thereto of an air hose 30 terminating in a screw-on fitting 31.

In use, as illustrated in FIG. 2 the vacuum cup 11 will be placed against the glass to be repaired with a vacuum hose 32 secured in place on the connector fitting 17 and with the inner end of T-fitting long leg portion 20 in vertical alignment with the damaged zone D to be repaired. This is readily accomplished by sighting down the T-fitting 19 with the cap 26 and disc 27 removed. Thereafter, the T-fitting 19 will be screwed down against the glass so that the O-ring 24 seals thereagainst in surrounding relation with respect to the damaged zone. The apparatus is then retained securely in place during the remainder of the repair procedure by forming a vacuum within the vacuum cup 11 with use of a remote vacuum pump 33, as illustrated schematically in FIG. 5. The usual fluid epoxy mixture for repair is next drawn into the barrel of an ordinary medical syringe S by use of its plunger, for subsequent deposit on the glass of the damaged zone to be repaired. This is accomplished by piercing the resilient disk 27 with the medical syringe cannula or hollow needle, it being long enough to enable pressing at the damaged zone with the pointed tip thereof.

As illustrated schematically in FIG. 5, the air hose 30 interconnects between the T-fitting 19 and either remote vacuum pump 34 or remote compressor pump 35 through individual shut-off valves 39, 40, respectively, and common shut-off valve 41. Individual vacuum and pressure gauges 37, 38, respectively, at the remote position, inform the operator as to the amount of pressure or vacuum being applied above the pool of epoxy resin P during the repair process, it being understood that manipulation of said control valves permits the operator to alternately apply vacuum and pressure.

After or at the same time the epoxy resin or repair fluid P is being discharged upon the damaged zone to be repaired, pressing at the glass with the point of the syringe needle serves to facilitate entry of the fluid into the multiple internal fissures thereof. The successive application of vacuum and air pressure through air hose 30 by manipulating valves 39 and 40 between communication with vacuum pump 34 and air compressor pump 35 serves to repeatedly withdraw minute traces of air captured within the various fissures and voids of the damaged zone of glass to facilitate the entrance and substitution therefor under pressure of the clear epoxy repair fluid covering the zone, resulting in a practically invisible repair upon completion of the process. As described above, mechanical pressure will be applied to the damaged glass zone from time to time with the point of the syringe S to further facilitate entrance of the fluid epoxy during this process.

Upon completion of the procedure to the satisfaction of the operator as observed through both sides of the glass, the pressure or vacuum being supplied through hose 30 will first be discontinued, and this hose will be removed. The T-fitting 19 can then be unscrewed from vacuum cup 11 sufficiently to break the holding vacuum and allow complete removal of the apparatus, after which any excess epoxy fluid applied and projecting outwardly of the surface of the glass at the repair zone can be cut away after hardening by use of a cutting tool such as a single-edge razor blade.

While I have illustrated and described herein only one form in which my invention can conveniently be embodied in practice, it is to be understood that this embodiment is presented by way of example only, and not in a limiting sense. The invention, in brief, comprises all the embodiments and modifications coming within the scope and spirit of the following claims.

What I claim as new and desire to secure by Letters Patent is:

1. Apparatus for repairing laminated safety glass comprising, in combination, an elongated tubular member, means for supporting said tubular member so that its central, longitudinal axis is substantially perpendicular with respect to the surface of the glass to be repaired and with one end thereof in sealing relation with respect to and surrounding the damaged zone to be repaired, a resilient closure at the other end of said tubular member to provide for piercing thereof with the needle of a hypodermic syringe and thereby enable the injection of repair fluid upon the damaged glass zone to be repaired, and means communicating with the interior of said tubular member for alternately imposing reduced and increased air pressure therein to facilitate the withdrawal of air from the damaged zone and substitution therefor of the repair fluid.

2. Apparatus for repairing laminated safety glass as defined in claim 1, wherein the length of said tubular member is less than the length of the hypodermic needle to permit the application of mechanical pressure upon said damaged zone with the tip of the needle during the imposition of said reduced and increased air pressure by manipulation of the barrel of the hypodermic syringe at the outside of the tubular member, thereby further facilitating the substitution of the repair fluid for air contained in the damaged zone to be repaired.

3. Apparatus for repairing laminated safety glass as defined in claim 1, wherein said means for supporting said tubular member comprises a vacuum cup through which said tubular member projects, a sealing gasket about the peripheral edge of said vacuum cup and adapted to seal against the surface of the glass to be repaired in surrounding, spaced relation with respect to said one end of said tubular member, and means communicating with the interior of said vacuum cup for imposing a vacuum within said vacuum cup.

4. Apparatus for repairing laminated safety glass as defined in claim 3, wherein said means communicating with the interior of said tubular member and said means communicating with the interior of said vacuum cup comprise flexible hoses, and reduced and increased air pressure supply means communicating with the remote ends of said hoses.

5. Apparatus for repairing laminated safety glass as defined in claim 4, wherein said elongated tubular member comprises the opposed leg portions of a T-fitting, and wherein said means communicating with the interior of said tubular member comprises the laterally-outwardly-extending leg portion of said T-fitting.

6. Apparatus for repairing laminated safety glass as defined in claim 5, wherein said resilient closure comprises a resilient disk fitted against the outer end of said opposed T-fitting leg portions, and a cap threadingly received thereabout for retaining said disk in place, said cap having a central opening for passage of the hypodermic needle.

7. Apparatus for repairing laminated safety glass as defined in claim 6, wherein said means for supporting said tubular member with one end thereof in sealing relation with respect to and surrounding the damaged zone to be repaired comprises an annular groove at the inner end of said opposed T-fitting leg portions and an O-ring seated with said annular groove and projecting outwardly thereof.

* * * * *